US008805197B2

(12) United States Patent
Delfyett

(10) Patent No.: US 8,805,197 B2
(45) Date of Patent: *Aug. 12, 2014

(54) SIGNAL PROCESSING USING SPECTRALLY PHASE ENCODED OPTICAL FREQUENCY COMBS

(75) Inventor: Peter J. Delfyett, Orlando, FL (US)

(73) Assignee: University of Central Florida Research Foundation, Inc., Orldando, FL (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/038,732

(22) Filed: Mar. 2, 2011

(65) Prior Publication Data

US 2011/0255554 A1    Oct. 20, 2011

Related U.S. Application Data

(63) Continuation of application No. 12/026,963, filed on Feb. 6, 2008, now Pat. No. 7,917,039.

(60) Provisional application No. 60/900,575, filed on Feb. 9, 2007.

(51) Int. Cl.
| H04B 10/00 | (2013.01) |
| H04B 10/12 | (2006.01) |
| H04B 10/04 | (2006.01) |
| H04B 10/06 | (2006.01) |

(52) U.S. Cl.
USPC ........... 398/140; 398/141; 398/153; 398/182; 398/202; 398/204; 398/214

(58) Field of Classification Search
None
See application file for complete search history.

(56) References Cited

U.S. PATENT DOCUMENTS

| 5,960,016 | A | 9/1999 | Perry et al. |
| 6,061,379 | A | 5/2000 | Schoen |
| 6,181,568 | B1 | 1/2001 | McHugh et al. |
| 6,198,568 | B1 | 3/2001 | Galvanauskas et al. |
| 6,208,458 | B1 | 3/2001 | Galvanauskas et al. |
| 6,739,728 | B2 | 5/2004 | Erbert et al. |
| 6,873,454 | B2 | 3/2005 | Barty et al. |
| 7,113,327 | B2 | 9/2006 | Gu et al. |
| 2005/0219540 | A1 * | 10/2005 | Haensch et al. ............... 356/432 |

OTHER PUBLICATIONS

U.S. Appl. No. 60/900,575, filed Feb. 9, 2007, Delfyett.

* cited by examiner

*Primary Examiner* — Darren E Wolf
(74) *Attorney, Agent, or Firm* — Alchemy-Partners PC; Steven B. Kelber

(57) ABSTRACT

Methods, apparatus and systems for an optical system for data harvesting and pattern recognition. The system includes a mode locked laser for producing a comb of optical frequencies that is split into two identical combs, a wavelength division demultiplexer eparate the individual optical frequency components of one comb and modulates each optical frequency component with a different one of plural target objects. A second modulator modulates an input signal with the second comb and an optical splitter splits the modulated signal into plural optical frequency components each containing the input signal. An optical combiner simultaneously combines the components containing the real time signal with one of the components containing a target object to produce a temporally modulated interferogram, and a comparator simultaneously compares the two on a comb by comb basis using balanced differential detection to determine any of the plural target objects are found in the input signal.

11 Claims, 6 Drawing Sheets

SIGNAL PROCESSING USING SPECTRALLY PHASE ENCODED OPTICAL FREQUENCY COMBS

This application is a continuation of Application Ser. No. 12/026,963, filed Feb. 6, 2008, allowed, which claims the benefit under 35 U.S.C. 119(e) of U.S. Provisional Patent Application No. 60/900,575, filed on Feb. 9, 2007 and was funded in part by the DARPA PACT Program, which is incorporated by reference herein in its entirety.

FIELD OF THE INVENTION

This invention relates to signal processing and, in particular, to methods, apparatus and systems for a signal processing system for high speed signal processing and pattern recognition using two stabilized optical frequency comb beams, with independent dynamically encoded frequency components, combined with coherent interferometric detection methods.

BACKGROUND AND PRIOR ART

As the amount of digital information and communication increases, timely and accurate data collection for software based evaluation and correlation becomes increasingly more difficult. This increase in difficulty arises from three main issues: First, the shear volume of the data being generated. Second, the nature of the desired information (generally unexpected) relative to the comparison set and third, the desired information lies in the noise of the overall data set being evaluated.

Existing high performance computer designs face the historical challenges of generating enormous amounts of heat, processing latencies measured in the tens of nanoseconds as information is transmitted between components and, poor general processing flexibility due to dedicated vector processing and highly, to embarrassingly, parallel machines that perform poorly in general processing problems.

To put these challenges into perspective, a Pentium™ microprocessor generates approximately 100 W of waste heat in operation. For an individual computer this is manageable by heat pipes and convection cooling, but when used in an IBM supercomputer requiring over 130,000 microprocessors, the waste heat, cooling and power systems become incredibly complex and large. Processing latency time is directly related to the resistance in metal conductors. At room temperature a nanosecond is approximately the time required for an electron to flow through 12 inches of copper wire, whereas at liquid nitrogen temperatures, a latency time of tens of nanoseconds implies electrical conduction paths in excess of 50 feet. Performing processing in a relatively lossless manner, would have dramatic impact on the utility of ultra computing.

One lossless approach to overcoming the challenges of operating temperatures, latency times and processing limitations is to perform the computing function with light. However, for the last three decades optical computing has been the perennial technology of tomorrow because of the persistent limitations imposed by the lack of programmability and the slow translation of electric data into the optical regime.

Known prior art includes the following eight U.S. patents:
U.S. Pat. No. 7,113,327 issued to Gu et al. on Sep. 26, 2006 which discloses a high power fiber chirped pulse amplification system utilizing telecom-type components.

U.S. Pat. No. 6,873,454 issued to Barty et al. on Mar. 29, 2005 which describes a hybrid chirped pulse amplification system wherein a short-pulse oscillator generates an oscillator pulse that is stretched to produce a stretched oscillator seed pulse. A pump laser generates a pump laser pulse and the stretched oscillator seed pulse and the pump laser pulse are directed into an optical parametric amplifier to produce output amplified signal pulse and an output unconverted pump pulse that are directed into a laser amplifier producing a laser amplifier output pulse that is compressed to produce a recompressed hybrid chirped pulse amplification pulse.

U.S. Pat. No. 6,739,728 issued to Erbert et al. on May 25, 2004 discloses an easily aligned, all-reflective, aberration-free pulse stretcher-compressor in a compact geometry. The stretcher-compressor device is a reflective multi-layer dielectric that can be utilized for high power chirped-pulse amplification material processing applications. A reflective grating element of the device is constructed: 1) to receive a beam for stretching of laser pulses in a beam stretcher beam path and 2) to also receive stretched amplified pulses to be compressed in a compressor beam path through the same (i.e., common) reflective multilayer dielectric diffraction grating. The stretched and compressed pulses are interleaved about the grating element to provide the desired number of passes in each respective beam path in order to achieve the desired results.

U.S. Pat. Nos. 6,208,458 and 6,181,463 both issued to Galvanauskas et al. on Mar. 27, 2001 and Jan. 30, 2001, respectively, describe quasi-phase-matched parametric chirped pulse amplification system that substantially reduces the required pump peak power and pump brightness, allowing exploitation of spatially-multimode and long duration pump pulses. It also removes restrictions on pump wavelength and amplification bandwidth. This allows substantial simplification in pump laser design for a high-energy PCPA system and, consequently, the construction of compact diode-pumped sources of high-energy ultrashort optical pulses. U.S. Pat. No. 6,198,568 also issued to Galvanauskas et al. on Mar. 6, 2001 discloses use of Chirped Quasi-phase-matched materials in a chirped pulse amplification system wherein the limitations on maximum pulse energies from a fiber-grating pulse compressor are circumvented by placing a chirped-period quasi-phase-matched (QPM) crystal after the fiber-grating pulse compressor.

U.S. Pat. No. 6,061,379 issued to Schoen on May 9, 2000 teaches techniques for producing plasma x-ray laser amplifiers, encompassing laser generated high density, micron-sized plasma columns, and microwave driven low density, large plasma volumes which provide the population inversions necessary for x-ray lasing to occur in the plasmas.

U.S. Pat. No. 5,960,016 issued to Perry et al. on Sep. 28, 1999 discloses An all-reflective pulse stretcher for laser systems employing chirped-pulse amplification enables on-axis use of the focusing mirror which results in ease of use, significantly decreased sensitivity to alignment and near aberration-free performance.

As the amount of digital information increases, emphasis shifts from data collection to timely and accurate data processing. What is needed is an integration of fundamental advancements in the generation and recognition of optical patterns to improve the speed of high performance computing and data mining by two orders of magnitude.

SUMMARY OF THE INVENTION

A primary objective of the invention is to provide methods, apparatus and systems for an all optical device to improve the speed of high performance computing by more than three orders of magnitude, based upon the integration of fundamental advancements in the generation and relational recognition of optical patterns.

A secondary objective of the invention is to provide methods, apparatus and systems for the integration of fundamental advancements in the generation and recognition of optical patterns, to improve the speed of high performance computing and data mining by two orders of magnitude.

A third objective of the invention is to provide methods, apparatus and systems for programmable optical computing within a package having a small footprint and modest cost without energy intensive cooling requirements and achieves the basic goal of local super computing.

A fourth objective of the invention is to provide methods, apparatus and systems for an all optical device to provide dynamic coherent spectral relational information evaluation capability leveraging off of semiconductor based modelocked optical sampling clocks, optical frequency combs and coherent detection concepts for optical code division multiple access.

A first preferred embodiment of the invention provides an optical system for data harvesting and pattern recognition on plural channels. The system includes a mode locked laser for producing a comb of stabilized, coherent, phaselocked optical frequencies that are split into a first and a second set of identical optical frequency combs, a wavelength division demultiplexer to separate the individual optical frequency components of the first set of optical frequency combs and a first modulator for modulating each one of the plural optical frequency components of the first optical frequency comb with a different one of plural target objects. A second modulator modulates an input data signal with the second set of optical frequency combs and an optical splitter for splits the modulated input data signal into plural optical frequency components each containing the input data signal. An optical combiner simultaneously combines one of the plural optical frequency components containing the real time signal with one of the plural optical frequency components that contain one of the plural target object to produce a temporally modulated interferogram, and a comparator simultaneously compares the plural optical frequency components containing the real time signal with the plural optical frequency components containing the plural target objects from the optical combiner on a comb by comb basis using balanced differential detection to determine if one or more of the plural target objects are found in the input signal, the system performing simultaneous matched filtering on plural channels.

A second embodiment provides a method for performing simultaneous matched filtering on plural channels and includes the steps of providing a data base for storing plural target objects to be detected and generating a first and second set of optical frequency combs of coherent phaselocked optical frequency components. The individual optical frequency component of the first optical frequency comb are modulated with a different one of the plural target objects and individual optical frequency components of the second optical frequency comb are modulated with an input signal. Simultaneously the modulated optical frequency components containing the plural target objects are combined with the modulated optical components containing the input signal to produce a temporally modulated interferogram. Then each one of the frequency components containing one of the target object are simultaneously compared with a same optical frequency component containing the input signal to detect when one or more of the plural target objects appear in the input signal.

Further objects and advantages of this invention will be apparent from the following detailed description of preferred embodiments which are illustrated schematically in the accompanying drawings.

DESCRIPTION OF THE PREFERRED EMBODIMENTS

Figure 1:
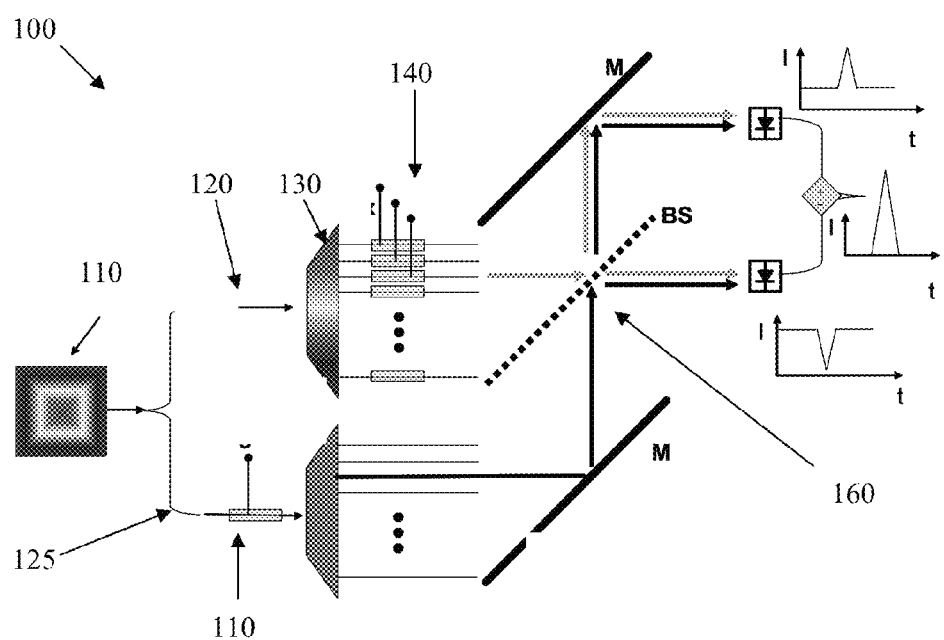
FIG. 1 is a schematic diagram of an optical parallel signal processor configured for identifying a multiplicity of target objects within a real time signal.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | optical system |
| 110 | modelocked laser |
| 120 | optical frequency comb |
| 125 | optical frequency comb |
| 130 | wavelength division demultiplexer |
| 140 | optical frequency component |
| 150 | optical splitter |
| 160 | beam splitter/combiner |
| 200 | external laser cavity |
| 210 | semiconductor optical amplifier |
| 220 | etalon |
| 300 | PDH stabilization loop |
| 310 | polarized beam splitter |
| 320 | photodetector |
| 330 | mixed |
| 340 | RF modulation signal 340 |
| 350 | error signal |
| 360 | proportional-integral-differential controller |

The following abbreviations are used throughout the specification and the drawings for components and telecommunication terminology:
CDMA code division multiplex access
CFBG chirped fiber Bragg gratings
COSP coherent optical signal processing
OCDMA optical code division multiplex access
SLM Spatial Light Modulator
WDM wavelength division multiplexing It would be useful to discuss the meanings of some words used herein and their applications before discussing the invention including:

Optical Frequency Comb—An optical frequency comb is a very precise tool for measuring different colors or frequencies of light. The technology, made possible by recent advances in ultrafast lasers, accurately measures much higher frequencies than any other tool. Optical frequency combs rely on the relationship between time and frequency, but is simply the number of oscillations per unit of time. The systems starts with lasers that emit a continuous train of very brief, closely spaced pulses of light containing a million different colors. The properties of the light over time are converted to frequency numbers to make what looks like a comb. Time and frequency are inversely related; that is, smaller units of time (or faster oscillations of light waves) result in larger frequency numbers.

Interferometry—Interferometry is the technique of superimposing (interfering) two or more waves, to detect differences between them. Interferometry works because two waves with the same frequency that have the same phase will add to each other while two waves that have opposite phase will subtract. Typically, in an interferometer, a wave is split into two (or more) coherent parts, which travel different paths, and the parts are then combined to create interference. When the paths differ by an even number of half-wavelengths, the superposed waves are in phase and interfere constructively, increasing the amplitude of the output wave. When they differ by an odd number of half-wavelengths, the combined waves are 180° out of phase and interfere destructively, decreasing the amplitude of the output. Thus anything that changes the phase of one of the beams by only 180° shifts the interference from a maximum to a minimum. This makes interferometers sensitive measuring instruments for anything that changes the phase of a wave, such as path length or refractive index.

The methods, apparatus and systems of the present invention provide an optical device for speed of high performance computing by more than three orders of magnitude, based upon the integration of fundamental advancements in the generation and relational recognition of optical patterns to improve the speed of high performance computing and data mining by two orders of magnitude.

The solution to achieve the levels of performance required to realize advanced pattern recognition, signal processing and related applications is based on several key innovations including ultra low jitter/noise using optical comb generation and unique amplitude and phase encoding of the individual combs. It is also necessary to achieve a high dynamic range of greater than approximately 120 dB of dynamic range, high contrast phase encoding that requires ten times less dynamic range than quadrature encoding, high speed modulation per channel/color with a high repetition rate of greater than approximately 10 GHz and short pulse of approximately 40 pico seconds, and a high number of channels/color for Emitter of approximately 200 Channels/Colors 0.01 Å/1 GHz line width.

Other requirements include optical injection locking for synchronized coherent carrier generation, an integrated device as a cost effective telecommunication components, high bandwidth spatial light module for both phase and intensity because conventional spatial light modulators either have low bandwidth/frame rates or non linear performance with time and operation, and phase encoding for phase coherent communication.

The advancements identified in the previous paragraphs enable a dynamic coherent spectral relational information evaluation capability leveraging off of semiconductor based modelocked optical sampling clocks, optical frequency combs and coherent detection concepts for optical code division multiple access such that their integration provides signal processing capabilities initially of approximately 0.32 Tb/s.

For purpose of example, the three general architectures are schematically illustrated in FIGS. 1 and 2. FIG. 1 is a schematic diagram of an optical parallel signal processor configured for identifying a multiplicity of target objects within a real time signal. The approach shown in FIG. 1 utilizes spatial-spectral dispersion with subsequent modulation/coding on individual comb components and illustrates the primary optical architecture that is employed for real time optical signal processing and pattern recognition for performing simultaneous matched filtering on N channels.

Figure 2A:
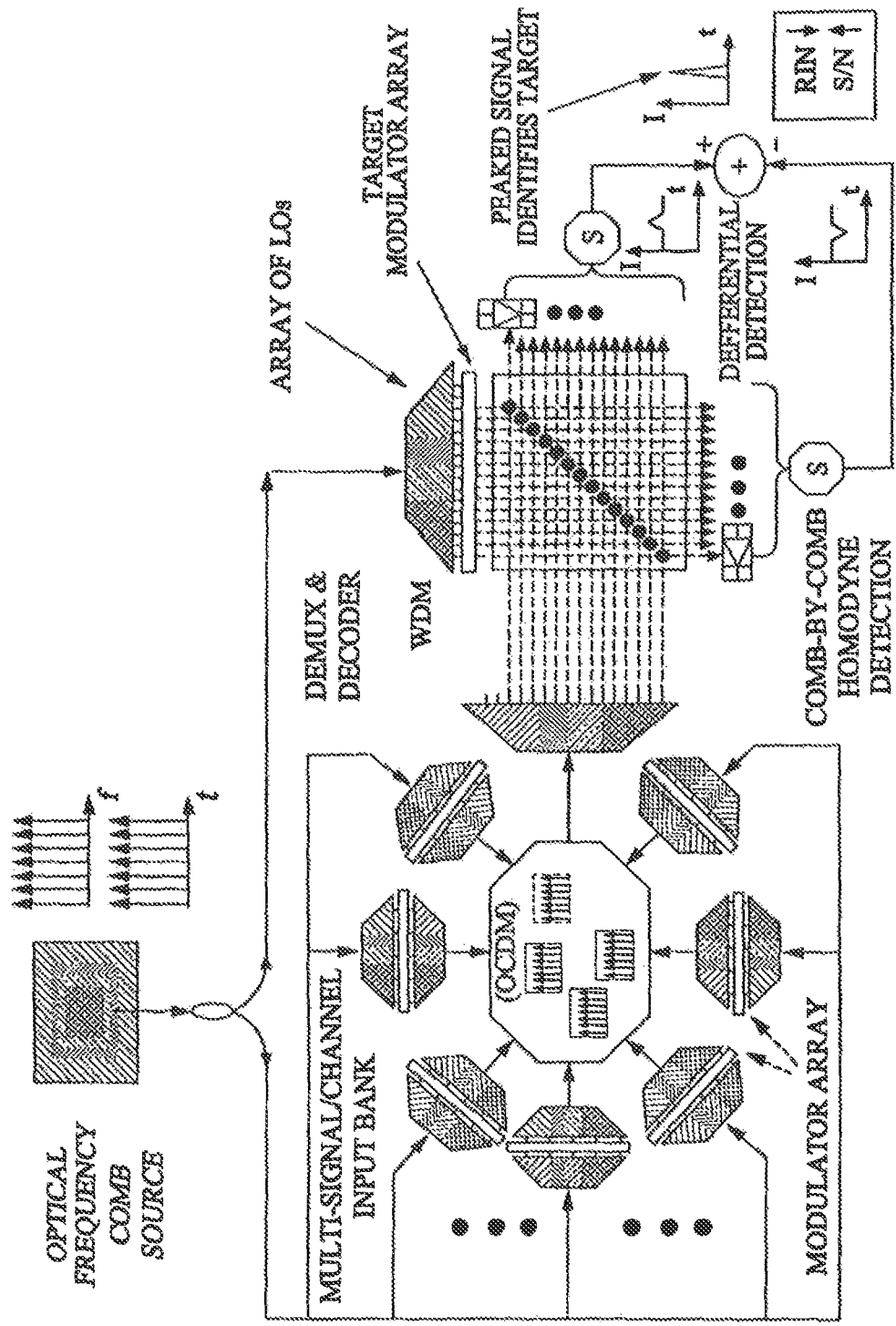
FIG. 2a is a schematic diagram of a spatial-spectral holographic detection system for real time filtering
Figure 2B:
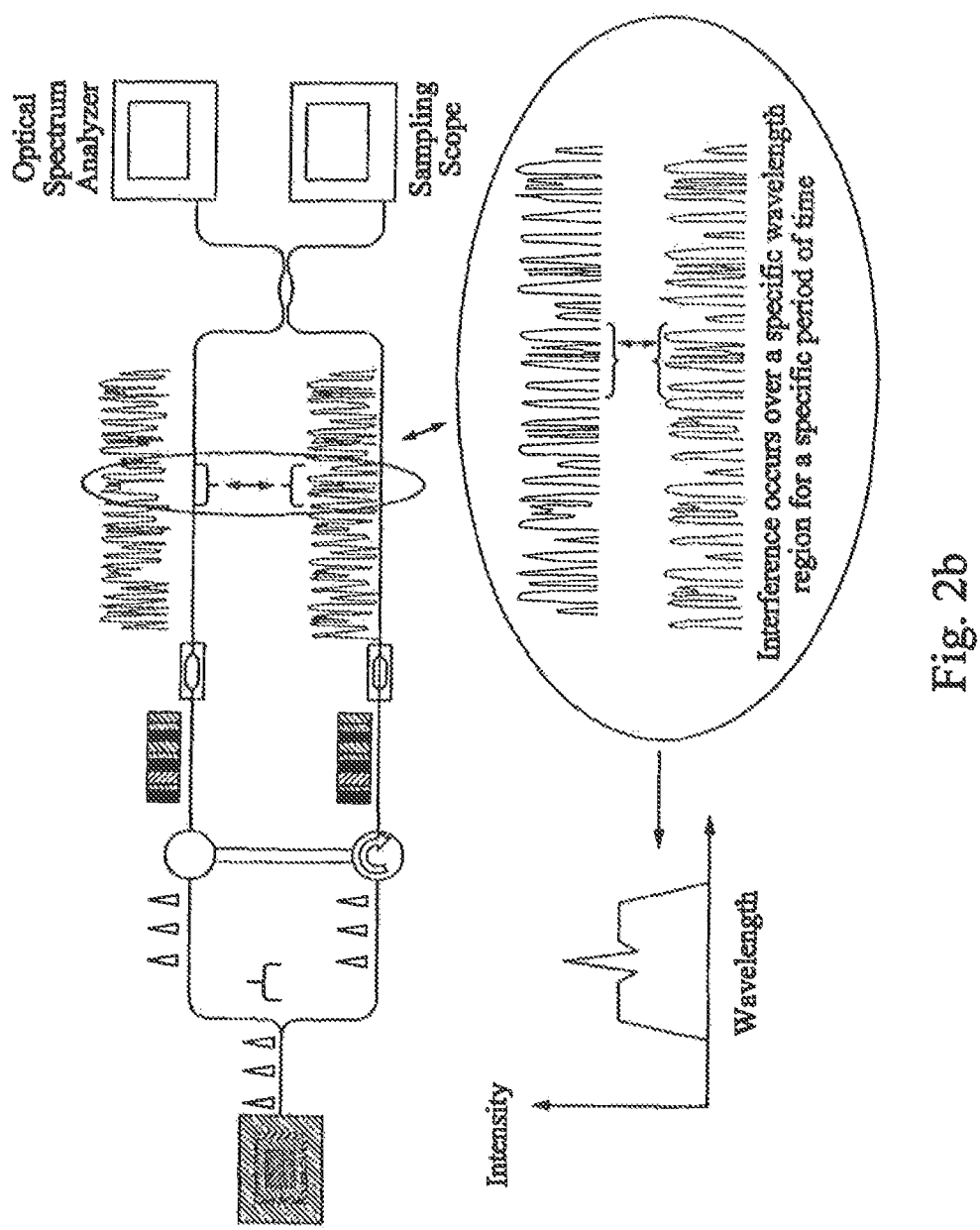
FIG. 2b is a schematic diagram of a temporal-spectral interferometer that is useful in time domain based convolution.

FIG. 2a is a schematic diagram of a spatial-spectral holographic detection system for real time filtering and FIG. 2b is a schematic diagram of a temporal-spectral interferometer that is useful in time domain based convolution. The approach shown in FIGS. 2a and 2b use temporal spectral dispersion, with a single modulator temporally encoding the entire comb set and shows the useful signal processing capabilities including matched filtering and real time optical convolution on ultrafast temporal optical signals.

The present invention provides a robust, compact, scalable optical signal processing system for signal processing and pattern recognition speeds in excess of approximately 320 Gb/s, preferably speeds in excess of 200 Tb/s. The signal processing system employs two stabilized optical frequency comb beams, with independent, dynamically encoded frequency components, combined with coherent interferometric detection. The optical frequency comb is generated on an approximately 10 GHz frequency grid, enabling the individual modulation rates to be approximately 10 GHz. The overall signal processing bandwidth capability is equal to the number of frequency combs times the modulation rate per frequency comb. Achieving an ultimate signal processing rate of 200 Tb/s requires 20,000 individual frequency comb components, implying a full octave of optical bandwidth, for a center wavelength of 1550 nm. The development of the signal processing system yields tremendous advantages in pattern recognition and detection of real time, dynamic time domain signals and space domain hyperspectral images. By employing these new optical techniques, unprecedented signal sensitivity and dynamic range is achievable, allowing for ranging and detection capabilities with orders of magnitude increase in sensitivity or a comparable reduction in transmit power.

The technical solution to achieve the levels of performance required to realize advanced pattern recognition, signal processing and related applications is based on based on 1) optical frequency comb generation/stabilization concepts, 2) unique amplitude and phase encoding using individual comb components, and 3) dynamic coherent spectral interferometry.

The type of laser used to make the comb is critical to precision. The shorter the laser pulses, the broader the range of frequencies in the comb. Use of a "mode-locked" lasers that emit femtosecond pulses lasting quadrillionths of a second, or millionths of a billionth of a second results in a comb that spans several hundred thousand frequencies, or teeth, enabling flexible and accurate measurements of wide-ranging or widely varied phenomena.

Recent work in semiconductor based modelocked optical sampling clocks, optical frequency combs and coherent detection concepts for optical code division multiple access under Defense Advanced Research Projects Agency (DARPA) support has lead to new knowledge allowing for an advancement of these technologies such that their integration provides signal processing capabilities approaching approximately 200 Tb/s. To date, only classic high speed digital computers and complex software based search algorithms are used. For example the intelligence data gathered prior to September 11, under the Army's Able Danger, totaled 2.5 terabytes and was collected by a simple search engine and main frame computer scanning text on websites looking for text correlations. 2.5 terabytes of data is equal to approximately 12 percent of all printed pages held by the Library of Congress. An optimized Coherent Optical Signal Processing (COSP) system could data mine the entire Library of Congress every few seconds.

The technical approach at solving the problems associated with prior art computing uses parallel processed based pattern recognition for real time video streaming. FIG. 1 is a schematic diagram of a spectral-spatial dispersive architecture for performing simultaneous matched filtering on N channels showing the main architecture of the present invention for pattern recognition using parallel processing to simultaneously compare a set of target signals that are known to the user or the application with a multiplicity of identical "real time signals" which may contain one or more of the target signals. For purpose of example, the parallel processing system is described for identifying specific "target objects" within an image, where the real time signal is a streaming video signal.

Generally, the system includes "target objects" that are know a priori to the user or to the application. The target objects may appear in a real time video signal and the system identifies and notifies the user or application that one or more of the target objects have been identified in the real time signal. The different target objects are impressed onto a phase coherent, correlated set of separate optical frequencies, where each target object is impressed onto a different optical frequency. The real time signal is simultaneously impressed on a separate, but identical set, of optical frequencies. Correlation or identification of the target object within the real time video signal is accomplished by combining the optical frequency comb components containing the target objects, with the real time video signal, in an optical interferometer. Each target object is then compared, or correlated with the real time signal. Since each of the target objects are simultaneously being compared to the real time signal, the application simultaneously searches for the full set of target objects within the real time signal, simultaneously, to achieve the fast signal processing capability allowed by parallel processing.

FIG. 1 is a schematic diagram showing a spectral-spatial dispersive architecture 100 for performing simultaneous matched filtering on N channels according to the present invention. The modelocked laser 110 produces a comb of stabilized, coherent, phaselocked optical frequencies. The combs are split into two sets of identical optical frequency combs 120 and 125. One set of combs 120 are spectrally demultiplexed using a wavelength division demultiplexer 130 to separate the individual optical frequency components 140. Each individual frequency component is modulated with one of the target objects, "N" target objects to be located in this example, "N" frequency combs are modulated. For example, a single target image is converted to a temporal signal by raster scanning the image and converting the video image of the target to a temporal signal. The temporal signal is then impressed onto one of the optical frequency comb components. This procedure is performed for each target object of interest.

The second set of frequency combs 125 is modulated with the real time signal that is to be searched. This modulated signal is split into "N" identical signals using a 1×N optical splitter 150. Each of the N modulated signals containing the real time signal to be searched is combined with each of the N individual optical frequency components that contain the information of the N target objects, using a 2 by 2 combiner or beam splitter/combiner 160. The process of combining the modulated signals creates a temporally modulated interferogram. The two output paths from the beam combiner are detected using balanced differential detection. If the signals do not match, the output from both interferometer ports is equal in magnitude, and subsequently subtracted in the differential detection process, yielding a null output. If the signals do match, then the interferometer possesses an output that is constructively interfering in one port, and destructively interfering in the other port. Differential detection thus generates a non nulled output photocurrent, signaling that a match occurs between the real time signal and a specific target object.

Additional signal processing functionalities are realized using ultra-short pulse laser technology and high quality optical frequency combs. These signal processing capabilities are also based on coherent spectral interferometric techniques and are accomplished by incorporating one of a temporal-spectral dispersive architecture, a spectral dispersive architecture or a combination/hybrid temporal/spatial spectral dispersion for data harvesting and pattern recognition. These approaches use extreme temporal stretch technology to broaden ultra-short pulses in time for generating time reversed optical waveforms, critical in performing real time convolution of ultrafast optical signals.

The method takes the broad optical spectrum of an ultra-short pulse and splits it with wavelength division multiplexing (WDM) components, common in optical communications, into a large number of frequency components that are then individually phase and amplitude modulated. This leads to performing real time matched filtering of ultrafast optical signals, and or creating arbitrary waveforms with amplitude and phase components that are optimally selected to perform matched filtering with high dynamic range. An additional advantage is that by dealing with each individual frequency component, complex signals with large time-bandwidth products is created to exploit the processing gains associated with excess bandwidth. Finally, arbitrary THz-bandwidth signals can be generated with low speed electronics.

The initial method for generating long chirps is with commercially available chirped fiber Bragg gratings (CFBGs). CFBGs can be fabricated with extremely large optical group delay dispersions that is used to temporally stretch short optical pulses of approximately 0.5 picoseconds to temporal durations extending to several tens of nanoseconds. The temporally stretched pulses possess an instantaneous frequency that varies linearly from either low frequency to high frequency (up chirped) or from high frequency to low frequency (down chirped). The salient feature of these chirped pulses is that the chirped characteristic is identical to the chirped characteristic of that used in RF radar systems.

The data/pattern match obtained from the two signals and the magnitude of the interference is proportional to the correlation of the pattern and is read out in a simple intensity or spectral manner. The more complex the pattern, or the higher the concentration of data, the better the correlation becomes. The speed of data processing is virtually independent of the complexity of the pattern or the density of the data. This method is used to implement not only pattern recognition but also optical variants of two-dimensional Fourier-Transforms and other mathematical functions at approximately the speed of light.

The initial device configuration was tested in an experiment to measure spatial displacement for a light detection and ranging application. The experiment effectively demonstrated a rudimentary form of pattern recognition. The same measurement/pattern recognition technique is used to accomplish a number of mathematical processes in a completely programmable methodology such as data mining or an optical search of patterns in telecommunication signals. The type of encoding that cellular communication utilizes is spread spectrum encoding. An optical method of spread spectrum encoding utilizing the long stretched chirped optical pulse was demonstrated.

The general optical design for impressing a spread spectrum signal on an optical carrier was previously described in the background section of the specification. Traditionally cellular voice communication is accomplished with a 64K bit data rate per channel. With a 200 Tb/second data rate data mining capability a single TBM coherent optical signal processing system is able to interrogate or data mine approximately 3 billion cell phone conversations simultaneously.

An example of an application is data mining or optically searching patterns in video communications. Due to the nature of real time video streaming, these applications are of particular interest to many national security organizations. An alternative type of encoding that allows for high dynamic range in a matched filtering application similar to cellular communication and uses code division multiplex access encoding. Experiments were performed to demonstrate an optical method of code division multiplex access encoding utilizing spatially dispersed optical frequency combs.

Figure 3:
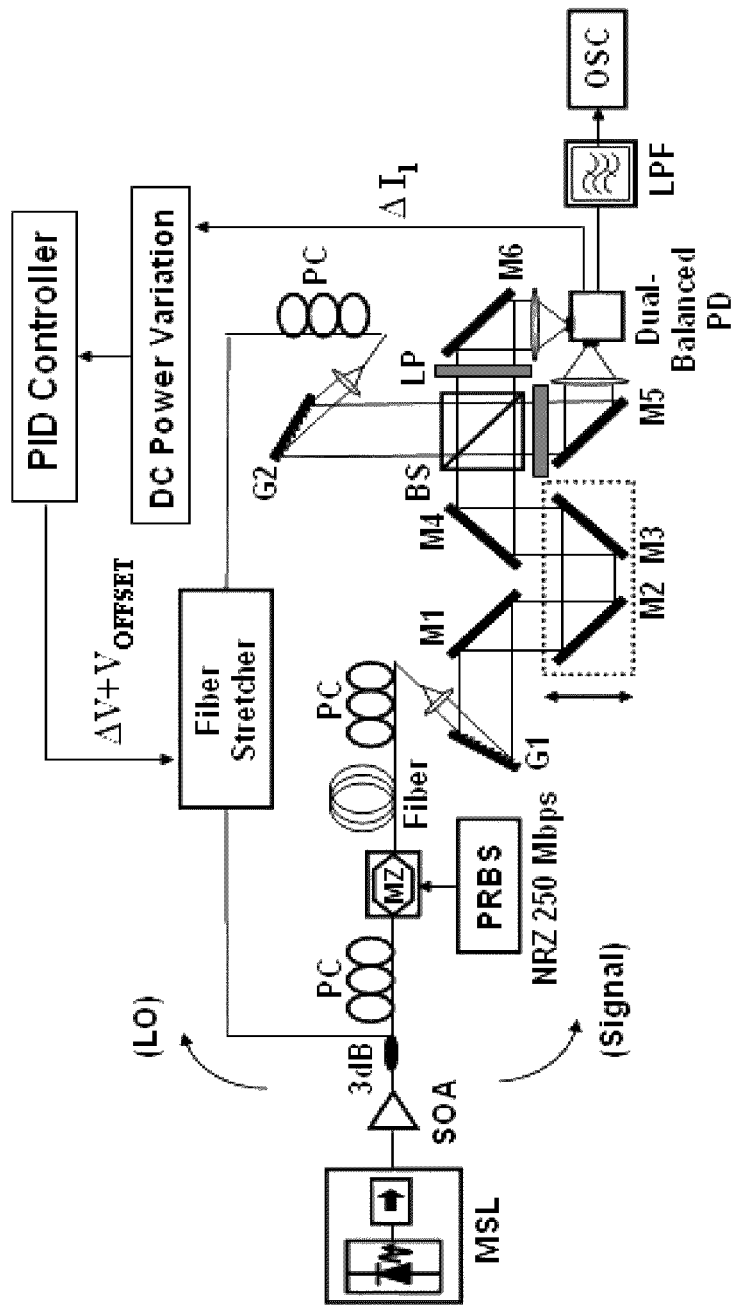
FIG. 3 is a schematic block diagram showing the initial device configuration for achieving optically based optical CDMA decoding of light based on optical matched filtering.

FIG. 3 is a schematic block diagram showing the initial device configuration for achieving optically based optical code division multiplex access decoding of light based on optical matched filtering for impressing a code division multiplex access signal on an optical carrier.

The optical code division multiplex access OCDMA shown in FIG. 3 shows the basic ability to encode and decode a CDMA/spread spectrum signal on an optical comb. The original application for the OCDMA program was to translate CDMA encryption capability to optical signals for secure optical data transmission in fiber optics. The original technical approach was to separate the individual colors of a chirped optical pulse.

This is accomplished by use of a commercial wavelength division de-multiplexer (WDM). Each individual color/channel is then encrypted using a combination of commercially off the shelf amplitude and phase/frequency modulator. These different encrypted colors/channels are recombined through the use of a commercial wave division multiplexer. The recombined optical pulse is then transmitted down the fiber optic channel to the receiver that has the opposite set of de-multiplexer, amplitude, phase modulators and multiplexer to decode the encrypted data.

An alternative approach eliminates the large number of amplitude and phase/frequency modulators by stretching the chirped optical pulse to a greater than 1 nanosecond (ns) pulse length and modulating the amplitude and phase/frequency without separating the individual colors or signals. Both modulation technical approaches are viable for individual color/channel modulation providing better encryption than the single pulse modulation technique.

The development of an optical signal processing technology scalable to 200 Tb/s opens new avenues for imaging radar, ultrawide bandwidth communications and the processing of millions of simultaneous telecommunications channels.

Utilizing multi-wavelength, high data rate streams of ultrashort optical pulses for applications in network technology has been accomplished experimentally as well as a fiber-ized prototype of a multi-wavelength modelocked semiconductor diode laser, with an 8-wavelength output that matches the 8-wavelength grid that is employed in the DARPA MONET Program. Experiments have demonstrated the complete programmability of this multi-wavelength WDM source for applications that employ a broadcast and select architecture. The approach evolves into an integrated optic version, based on proprietary intellectual property owned by the University of Central Florida, assignee of the subject patent application.

Optical signal processing functions such as pattern recognition/correlation, and multidimensional Fourier transformation is accomplished by the independent and arbitrary modulation of two sets of coherent, phase-locked optical frequency combs, interferometrically combined and coherently detected using spectral holographic techniques. Key to the technique is that the temporal content of wide bandwidth signals are spatially distributed and modulated yielding spectral analysis of temporal signals, simultaneously with the pattern recognition of space domain signals (images).

Figure 4:
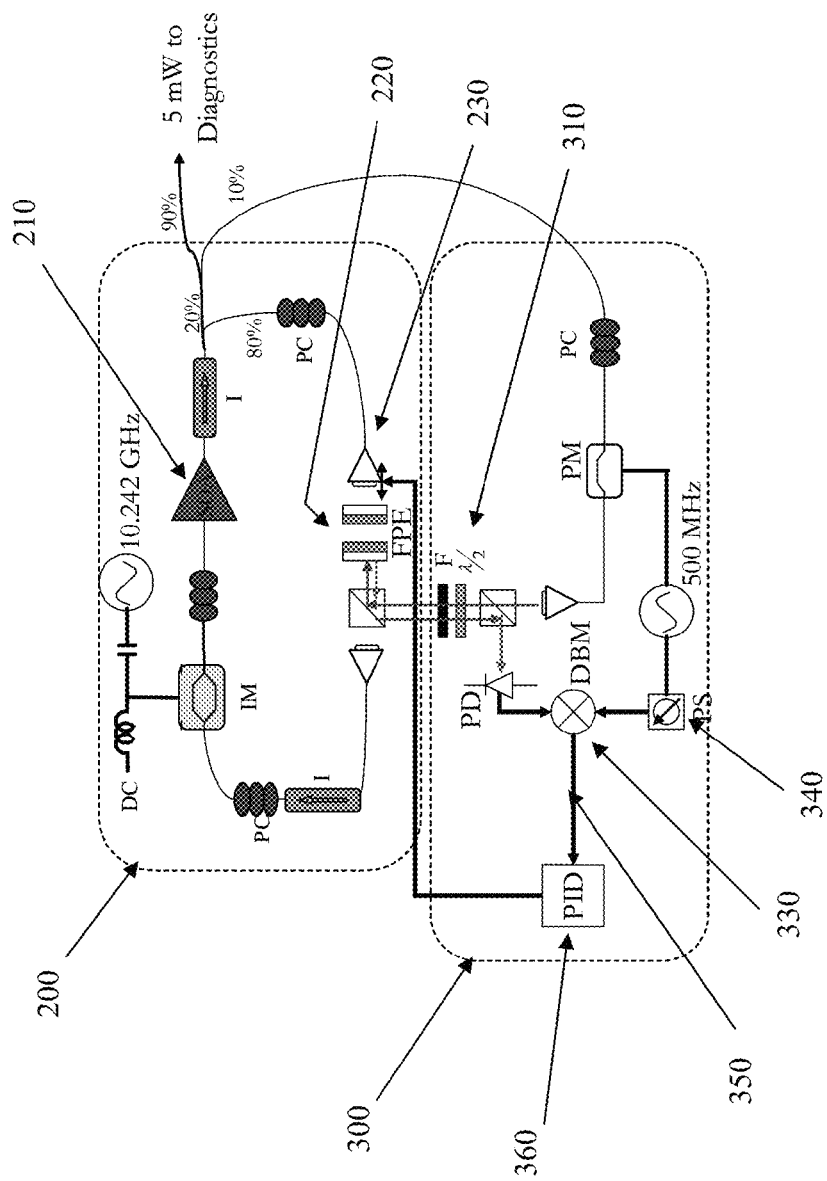
FIG. 4 is a schematic diagram of a frequency stabilized optical frequency comb generator based on harmonic modelocking supermode suppression and intracavity Pound-Denver-Hall stabilization.

Referring to FIG. 4, the optical frequency comb generator is based on an external cavity 200, harmonically modelocked ring cavity that uses a semiconductor optical amplifier 210 as the optical gain element. In order to have a high quality optical frequency comb with narrow comb element line width and wide comb spacing, the laser is configured to possess a large optical cavity length, approximately 30 meters, that translates to a passive cavity comb spacing of 10 MHz and a comb element linewidth of approximately 100 kHz for a passive cavity Finesse of approximately 100. To obtain a wide comb spacing, an intracavity etalon 220 with a free spectral range of approximately 10 GHz is inserted into the cavity. The etalon selects a group of comb elements that are made to be coherent by modulating the cavity loss at 10 GHz, i.e., by modelocking the laser at approximately 10 GHz. The output of the laser is a periodic optical pulse train with a pulse repetition frequency of approximately 10 GHz. The intensity spectrum is a comb of phase locked optical frequencies separated by approximately 10 GHz, with a line width of each comb element of approximately 100 kHz.

To maintain this mode of operation, a feed back loop 300 based on a phase modulation technique generates a differential error signal 350 that allows the long ring cavity to maintain a length that is an exact multiple of the etalon path length. The technique is a modified Pound-Drever-Hall technique that employs the PDH technique on the intracavity etalon.

The operation of the feedback loop is as follows: A portion of the modelocked laser output is phase modulated at approximately 500 MHz and injected into the laser cavity using a polarization beam splitter 310. The phase modulated sidebands of the injected signal reflect from the etalon 220 along with a small portion of the unmodulated incident field. The phase modulated sidebands create two intensity beat signals that are out of phase with respect to each other. The magnitude of each beat signal is proportional to the frequency detuning of the unmodulated incident with respect to the frequency of maximum transmission of the etalon 220. The beat signals are detected with a photodetector 320 and mixed 330 with the RF modulation signal 340 at 500 MHz in phase quadrature. The resultant error signal 350 is fed to a "proportional-integral-differential" 360 controller and the output is applied to a piezoelectric transducer 230 to adjust the cavity length. Stable operation of the laser is maintained for hours.

Figure 5:
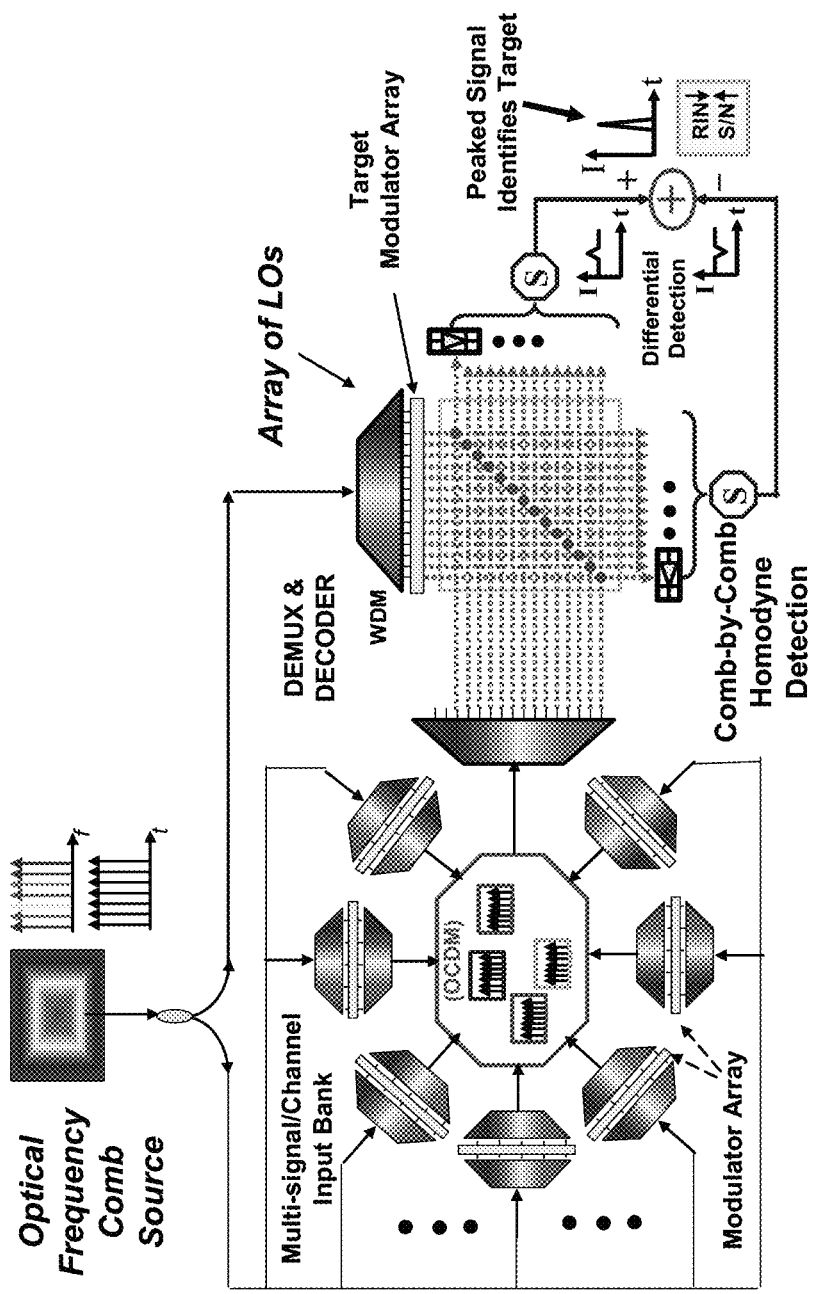
FIG. 5 is a schematic diagram of performing matched filtering using spatial-spectral holography.

The signal processing architecture uses the broad bandwidth generated by the coherent optical frequency combs shown in FIG. 5. The architecture is realized by performing spectral filtering by dispersing the combs in space with high resolution wavelength demultiplexers, and then using spatial modulator arrays to impress the signals onto the comb components. Two sets of combs are created by splitting the light. The combs can be subsequently split further, for scaling the overall signal processing bandwidth. Each comb set is separated by a high resolution optical frequency demultiplexer. Multiple independent signals are impressed onto each comb component. The modulation format can be complex, i.e., manipulating the optical intensity or optical phase of each comb component. To exploit the total potential signal processing bandwidth, multiple signals, or channels, are multiplexed together. The multiplexing formats can be of the time division type, wavelength division type, code division type or spread spectrum type.

Pattern recognition is performed by coherent detection, using a second comb set. This second set of combs are wavelength demultiplexed, and a synchronous modulation of the independent comb components is performed, with the modulation containing information of the signals to be identified on the multi-signal input bank. Coherent homodyne detection is performed on a comb by comb basis, with the resulting baseband signals being combined using differential detection methods. The baseband signals generated from each homodyne signal will be processed in a manner commensurate with the modulation and multiplexing format used to encode the multiple input channels.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. An optical signal processing apparatus for data harvesting and pattern recognition on plural channels based on an input data signal comprising:
    a mode locked laser for producing a comb of stabilized, coherent, phaselocked optical frequencies that are split into a first and a second identical optical frequency comb each said comb being generated on an approximately 10 GHz frequency grid;
    a wavelength division demultiplexer to separate individual optical frequency components of the first optical frequency comb;
    a first modulator for modulating each optical frequency component of the first optical frequency comb with a different one of plural target objects;
    a second modulator for modulating said input data signal with the second optical frequency comb;
    an optical splitter for splitting the modulated input data signal into plural optical frequency components each containing the input data signal;
    an optical combiner for simultaneously combining one of the plural optical frequency components containing a real time signal with one of the plural optical frequency components that contain one of the plural target object to produce a temporally modulated interferogram; and
    a comparator for simultaneously comparing the plural optical frequency components containing the real time signal with the plural optical frequency components containing the plural target objects from the optical combiner on a comb by comb basis using balanced differential detection to determine if one or more of the plural target objects are found in the input data signal, the apparatus performing simultaneous matched filtering on plural channels.

2. The apparatus of claim 1, wherein the first modulator comprises:
    a raster scanner for scanning each one of the plural target objects to generate plural temporal target signals; and
    a spatial modulator array for impressing each one of the temporal target signals onto one of the optical frequency components of the first optical frequency comb.

3. The apparatus of claim 1, wherein the second modulator comprises:
    a modulator for modulating the second optical frequency comb with the input data signal; and
    a splitter for splitting the modulated optical frequency comb containing the input data signal into plural individual optical frequency components each containing the input signal.

4. The apparatus claim 1, wherein the optical frequency comb source comprises:
    a mode locked laser which comprises an external laser cavity harmonically modelocked;
    a stabilization feedback loop; and
    an intracavity etalon coupling the external laser cavity to the feedback loop.

5. The apparatus of claim 1, wherein the input data signal comprises:
    a real time video signal.

6. The apparatus of claim 1, wherein the optical combiner comprises:
    a N by N optical combiner for creating the temporally modulated interferogram.

7. The apparatus of claim 1, wherein the optical combiner comprises:
    a beam splitter for creating the temporally modulated interferogram.

8. The apparatus of claim 1, wherein the apparatus incorporates a temporal-spectral dispersive architecture for data harvesting and pattern recognition.

9. The apparatus of claim 1, wherein the apparatus incorporates a combination of one or more of a hybrid temporal and spatial spectral dispersion architecture for data harvesting and pattern recognition.

10. The apparatus of claim 1, wherein the apparatus incorporates a Spectral dispersive architecture for data harvesting and pattern recognition.

11. The apparatus of claim 1, wherein the first and second modulators modulate using a complex format, comprising manipulating the optical intensity or optical phase of each comb optical frequency component.

* * * * *